US011063529B2

(12) United States Patent
Sato (10) Patent No.: US 11,063,529 B2
(45) Date of Patent: Jul. 13, 2021

(54) CONTROL DEVICE OF MOTOR AND STORAGE MEDIUM (71) Applicant: Nidec Tosok Corporation, Zama (JP)

(72) Inventor: Kei Sato, Zama (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 0 days.

(21) Appl. No.: 16/634,608

(22) PCT Filed: Aug. 24, 2018

(86) PCT No.: PCT/JP2018/031305
§ 371 (c)(1),
(2) Date: Jan. 28, 2020

(87) PCT Pub. No.: WO2019/044684
PCT Pub. Date: Mar. 7, 2019

(65) Prior Publication Data
US 2021/0099100 A1 Apr. 1, 2021

(30) Foreign Application Priority Data
Aug. 31, 2017 (JP) ................. 2017-166913

(51) Int. Cl.
H02P 27/08 (2006.01)
H02M 7/48 (2007.01)

(52) U.S. Cl.
CPC ............. H02M 7/48 (2013.01); H02P 27/08 (2013.01)

(58) Field of Classification Search
None
See application file for complete search history.

(56) References Cited

U.S. PATENT DOCUMENTS 6,082,196 A * 7/2000 Nonoyama ........... G01P 15/131
73/514.18
7,567,048 B2 * 7/2009 Shin ....................... H02M 1/12
318/400.24
(Continued)

FOREIGN PATENT DOCUMENTS

JP 05-219787 A 8/1993
JP 2011-223712 A 11/2011
(Continued)

OTHER PUBLICATIONS

Official Communication issued in International Patent Application No. PCT/JP2018/031305, dated Nov. 20, 2018.

Primary Examiner — Bentsu Ro
(74) Attorney, Agent, or Firm — Keating & Bennett (57) ABSTRACT A signal generator generates a control signal that causes an inverter to supply a drive current in an AC voltage waveform to each phase of a motor. The signal generator alternately repeats a first energization cycle in which only a switch on an upper side of an arm is set to an ON state and a second energization cycle in which only a switch on a lower side of the arm is set to the ON state in the AC voltage waveform having a third energization cycle therebetween, changes the switches on the upper side and the lower side of the arm to the ON state and an OFF state in order in the third energization cycle, continuously changes an output voltage of the switch that has been further changed to the ON state, and generates a control signal to cause waveforms of the preceding and succeeding first energization cycle and second energization cycle to be continuous with the third energization cycle by varying a phase of the first to the third energization cycles in each phase.

20 Claims, 8 Drawing Sheets (56) References Cited

U.S. PATENT DOCUMENTS

| | | | |
|---|---|---|---|
| 8,879,288 B2 | 11/2014 | Fujita | |
| 2004/0062354 A1* | 4/2004 | Kato | A61N 5/1042 378/152 |
| 2007/0069682 A1* | 3/2007 | Ide | H02P 6/183 318/719 |
| 2012/0229065 A1* | 9/2012 | Yokokawa | H02P 9/48 318/400.13 |
| 2014/0375239 A1* | 12/2014 | Kim | H02P 21/05 318/400.23 |

FOREIGN PATENT DOCUMENTS

| | | |
|---|---|---|
| JP | 2012-157135 A | 8/2012 |
| JP | 2014-087165 A | 5/2014 |
| JP | 2015-204722 A | 11/2015 |

* cited by examiner

CONTROL DEVICE OF MOTOR AND STORAGE MEDIUM

CROSS REFERENCE TO RELATED APPLICATIONS

This is a U.S. national stage of PCT Application No. PCT/JP2018/031305, filed on Aug. 24, 2018, and priority under 35 U.S.C. § 119(a) and 35 U.S.C. § 365(b) is claimed from Japanese Application No. 2017-166913, filed Aug. 31, 2017; the entire disclosures of each application are hereby incorporated herein by reference.

1. FIELD OF THE INVENTION

The present disclosure relates to a control device of a motor and a storage medium.

2. BACKGROUND

An inverter that drives a three-phase brushless motor or the like switches each of switching elements on an upper side and a lower side of an arm corresponding to each phase of the motor between an ON state and an OFF state and thereby supplies a drive current in an AC voltage waveform to each phase of the motor. For example, an energization circuit that switches a plurality of transistors with an arm/bridge configuration between an ON state and an OFF state according to a switching pulse and energizes each of phases of a motor in predetermined circulation order has been disclosed (e.g., see Japanese Patent Laid-Open No. H5-219787).

A square wave and a sine wave are known as general AC voltage waveforms. A square wave AC voltage waveform alternately repeats an energization cycle in which only a switching element on an upper side is in the ON state and an energization cycle in which only a switching element on a lower side is in the ON state having a non-energization cycle in which both switching elements are switched to the OFF state therebetween. Although an output voltage of the switching element in each energization cycle is constant, and a calculated amount of the output voltage may be small, since a direction of the current applied when an energization pattern is switched significantly changes, torque pulsation easily occurs.

On the other hand, in the case of a sine wave AC voltage waveform, the switching element on the upper side and the switching element on the lower side are alternately switched to the ON state and an output voltage of the switching element that has been switched to the ON state continuously changes. According to a sine wave AC voltage waveform, although a change in direction of a current applied when an energization pattern is switched is gradual and pulsation can be reduced, the output voltages in all phases need to be calculated. In addition, the output voltages in all phases need to be calculated at the same time, and therefore the amount of calculation is much larger than in the case of a square wave. Since hardware such as a computer and a memory that are necessary for calculation is required to have high performance, this results in increase in costs.

SUMMARY

The present disclosure aims to smooth control of rotation of a motor with a simple configuration.

An example embodiment of the present disclosure is a control device that controls driving of a motor including a plurality of phases, the control device including a signal generator that generates a control signal that causes an inverter to supply a drive current from a power supply to each phase of the motor, in which the inverter includes a plurality of arms corresponding to each of the phases of the motor, the arms being in a bridge connection, each of the arms including a switch on an upper side and a switch on a lower side that are connected in series, the switch on the upper side and the switch on the lower side of each of the arms being switched to an ON state and an OFF state according to the control signal, and thus a drive current in an AC voltage waveform being supplied to each phase of the motor, and the signal generator alternately repeats a first energization cycle in which only the switch on the upper side of the arm is set to the ON state and a second energization cycle in which only the switch on the lower side of the arm is set to the ON state in an AC voltage waveform having a third energization cycle between the first energization cycle and the second energization cycle, switches the switch on the upper side and the switch on the lower side of the arm to the ON state and the OFF state in order in the third energization cycle, continuously changes an output voltage of the switch that has been further switched to the ON state, and generates a control signal to cause waveforms of the preceding and succeeding first energization cycle and second energization cycle to be continuous with the third energization cycle by varying a phase of the first to the third energization cycles in each phase of the motor.

According to an example embodiment of the present disclosure, rotation of a motor can be smoothly controlled with a simple configuration.

The above and other elements, features, steps, characteristics and advantages of the present disclosure will become more apparent from the following detailed description of the example embodiments with reference to the attached drawings.

DETAILED DESCRIPTION

Control devices of motors and storage media according to example embodiments of the present disclosure will be described below with reference to the drawings.

Further, a scope of the disclosure is not limited to the following example embodiments and can be arbitrarily modified within the scope of the technical gist of the present disclosure. In addition, in the following diagrams, scales, numeric values, and the like of each structure may be set to be different from those of an actual structure in order to make each configuration understandable.

In addition, in the diagrams, illustration is with an XYZ coordinate system as a suitable three-dimensional Cartesian coordinate system. In the XYZ coordinate system, the Z-axis direction is set to a direction parallel to the one axial direction of the central axis J illustrated in FIG. 1. The X-axis direction is set to a direction parallel to the length direction of a busbar assembly 60 illustrated in FIG. 1, that is, the left-right direction in FIG. 1. The Y-axis direction is set to a direction parallel to the width direction of the busbar assembly 60, that is, the direction orthogonal to both the X-axis direction and the Z-axis direction.

In addition, in the following description, the positive side in the Z-axis direction (+Z side) will be referred to as a "front side" and the negative side in the Z-axis direction (−Z side) will be referred to as a "rear side." Further, the rear side and the front side are designations just used for the description and do not limit actual positional relations and directions. In addition, unless specified otherwise, a direction parallel to the central axis J (the Z-axis direction) will be referred to simply as an "axial direction," a radial direction from the central axis J will be referred to simply as a "radial direction," and a circumferential direction around the central axis J, that is, a direction around the central axis J (θ direction), will be referred to simply as a "circumferential direction."

Further, in the present specification, an extension in the axial direction includes an extension in a direction tilting from the axial direction at an angle in a range of less than 45° in addition to an extension in the exact axial direction (the Z-axis direction). In addition, in the present specification, an extension in the radial direction includes an extension in a direction tilting from the radial direction at an angle in a range of less than 45° in addition to an extension in the exact radial direction, that is, a direction perpendicular to the axial direction (the Z-axis direction).

<Electric Oil Pump>

Figure 1:
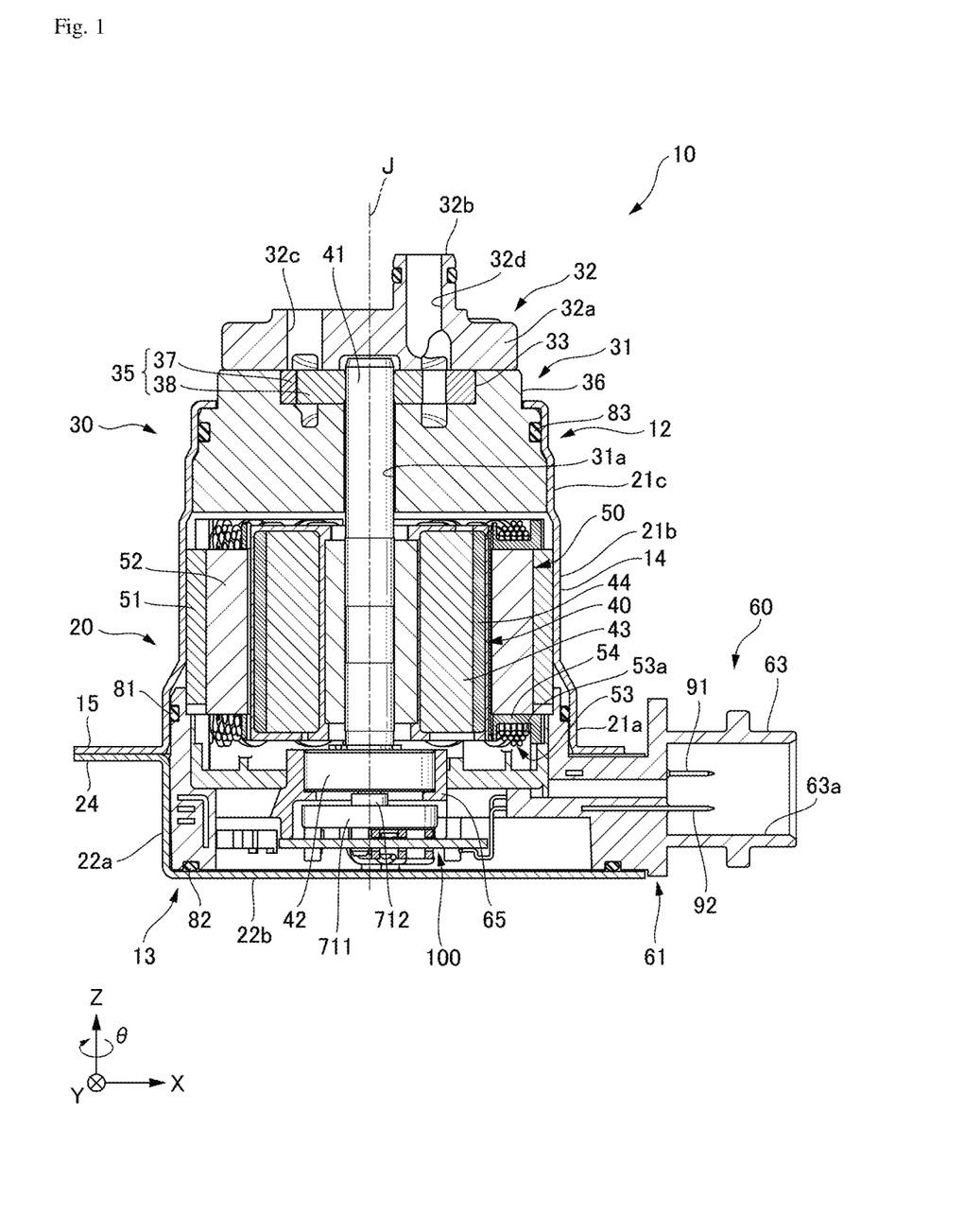
FIG. 1 is a cross-sectional view illustrating a configuration of an electric oil pump with a control device of a motor according to an example embodiment of the present disclosure.

FIG. 1 illustrates a configuration of an electric oil pump 10 with a control device of a motor according to the present example embodiment.

The electric oil pump 10 includes a shaft 41, a motor part 20, a pump part 30, a housing 12, and a drive device 100 of the motor part 20 as illustrated in FIG. 1. The shaft 41 rotates with respect to the central axis J extending in the axial direction. The motor part 20 and the pump part 30 are provided in the axial direction parallel to each other.

<Motor>

The motor part 20 includes a cover 13, a rotor 40, a stator 50, a bearing 42, a busbar assembly 60, a front O-ring 81, and a rear O-ring 82.

The rotor 40 is fixed to an outer circumferential surface of the shaft 41. The stator 50 is positioned on a side outward from the rotor 40 in the radial direction. That is, the motor part 20 is an inner rotor-type motor. The bearing 42 rotatably supports the shaft 41. The bearing 42 is held by the busbar assembly 60. The busbar assembly 60 is connected to an outer power supply to supply power to the stator 50 via the drive device 100.

<Cover>

A material of the cover 13 is, for example, a metal. The cover 13 is fixed to the rear side (−Z side) of the housing 12 and covers at least a part of the rear side (−Z side) of the busbar assembly 60. The cover 13 includes a tubular part 22a, a cover part 22b, and a flange part 24. The tubular part 22a is open toward the front side (+Z side). The cover part 22b is connected to the end of the tubular part 22a on the rear side. The cover part 22b has a flat plate shape in the present example embodiment. The flange part 24 extends outward in the radial direction from the end of the tubular part 22a on the front side. The housing 12 and the cover 13 are joined by a flange part 15 of the housing 12 and the flange part 24 of the cover 13 overlapping each other.

<Rotor>

The rotor 40 includes a rotor core 43 and a rotor magnet 44. The rotor core 43 is fixed to the shaft 41, and axially surrounds the shaft 41 (in the θ direction). The rotor magnet 44 is axially fixed to an outer side surface of the rotor core 43. The rotor core 43 and the rotor magnet 44 rotate integrally with the shaft 41. A permanent magnet is used as the rotor magnet 44. In the present example embodiment, particularly a rare-earth magnet having a strong attractive force and repulsive force, for example, a neodymium magnet, or the like, is used.

<Stator>

The stator 50 axially surrounds the rotor 40 (in the θ direction) and rotates the rotor 40 around the central axis J. The stator 50 includes a core back part 51, teeth parts 52, coils 53, and a bobbin (insulator) 54.

The core back part 51 has a cylindrical shape concentric with the shaft 41. The teeth parts 52 extend from an inner side surface of the core back part 51 toward the shaft 41. A plurality of teeth parts 52 are provided and disposed in the circumferential direction of the inner side surface of the core back part 51 at equal intervals. Each of the coils 53 is formed by winding a conductive wire 53a. The coils 53 are provided in the bobbin 54. The bobbin 54 is mounted on each of the teeth parts 52.

In the present example embodiment, the motor part 20 is a three-phase brushless motor. In addition, the three coils 53 are in a delta connection in the stator 50.

<Bearing>

The bearing 42 is disposed on the rear side (−Z side) of the stator 50. The bearing 42 is held by a bearing holding part 65 included in a busbar holder 61, which will be described below. The bearing 42 supports the shaft 41. A configuration of the bearing 42 is not particularly limited, and any known bearing may be used.

<Busbar Assembly>

The busbar assembly 60 includes a busbar 91 electrically connected to the stator 50 and the busbar holder 61 holding the busbar. The busbar holder 61 includes an opening on the rear side. The cover part 22b of the cover 13 blocks the opening of the busbar holder 61 on the rear side. In addition, the surface of the cover part 22b of the cover 13 on the front side comes in contact with the entire circumference of the rear O-ring 82. Accordingly, the cover 13 comes in contact with a main body rear surface of the busbar holder 61 on the rear side via the rear O-ring 82 around the circumference of the opening of the busbar holder 61.

The busbar holder 61 includes a connector part 63. The motor part 20 is connected to an external power supply via the connector part 63. The connected external power supply is electrically connected to the busbar 91 and a wiring member 92 projecting from the bottom of a power supply opening 63a included in the connector part 63. Accordingly, a drive current is supplied to the coils 53 of the stator 50 from the busbar 91 and the wiring member 92 via the drive device 100.

<Pump Part>

The pump part 30 of the present example embodiment is a gear pump that suctions in and discharges oil by the inner volume changing with rotational motion of the gear. The gear pump is one of positive displacement pumps, and a diaphragm pump that changes the inner volume using reciprocating motions of the diaphragm can also be used. If a positive displacement pump is used, oil can be sucked and discharged even when the motor rotates at a low speed, and high responsiveness of the electric oil pump can be achieved.

The pump part 30 is positioned on one side of the motor part 20 in the axial direction, specifically on the front side (+Z axis side). The pump part 30 is driven by the motor part 20 via the shaft 41. The pump part 30 includes a pump body 31, a pump cover 32, a pump rotor 35, and an O-ring 83.

The pump body 31 is fixed in the inside of the housing on the side in front of the motor part 20. An outer circumferential surface of the pump body 31 comes in contact with an inner circumferential surface of the housing 12 in the radial direction via the O-ring 83. The pump body 31 includes a pump chamber 33 that accommodates the pump rotor 35 and is recessed from the surface on the front side (+Z side) to the rear side (−Z side). The shape of the pump chamber 33 viewed in the axial direction is a circular shape.

The pump body 31b includes a through hole 31a that is open at both ends of the pump body in the axial direction allowing the shaft 41 to pass therethrough and has an opening on the front side that is open toward the pump chamber 33. The opening of the through hole 31a on the rear side is open toward the motor part 20. The through hole 31a functions as a bearing member that rotatably supports the shaft 41.

The pump body 31 includes an exposed part 36 that is positioned on the front side of the housing 12 and exposed to outside of the housing 12. The exposed part 36 is a part of the end of the pump body 31 on the front side. The exposed part 36 has a columnar shape extending in the axial direction. The exposed part 36 overlaps the pump chamber 33 in the radial direction.

The pump cover 32 is attached to the pump body 31 on the front side. The pump cover 32 includes a pump cover body 32a, a pump connector part 32b including a discharge opening 32d, and an intake opening 32c. The pump cover body 32a has a disc shape extending in the radial direction. The pump cover body 32a blocks the opening of the pump chamber 33 on the front side. The pump connector part 32b has a cylindrical shape extending in the axial direction. The pump connector part 32b includes the discharge opening 32d that is open at both ends in the axial direction. The pump connector part 32b extends from the pump cover body 32a to the front side. The intake opening 32c is open on the surface of the pump cover 32 on the front side. The discharge opening 32d and the intake opening 32c are connected to the pump chamber 33, enabling suction of oil to the pump chamber 33 and discharge of oil from the pump chamber 33. When the shaft 41 rotates in one circumferential direction (−θ direction), oil is sucked from the intake opening 32c to the pump chamber 33. The oil sucked to the pump chamber 33 is sent by the pump rotor 35 and discharged to the discharge opening 32d.

The pump rotor 35 includes an inner rotor 37 and an outer rotor 38. The inner rotor 37 is attached to the end of the shaft 41 on the front side. The outer rotor 38 surrounds an outer side of the inner rotor 37 in the radial direction. The inner rotor 37 has an annular shape and is a gear having teeth on the outer side surface thereof in the radial direction.

The inner rotor 37 meshes with the outer rotor 38, and thus the outer rotor 38 rotates when the inner rotor 37 rotates. Due to the rotation of the inner rotor 37 and the outer rotor 38, oil sucked from the intake opening 32c into the pump chamber 33 can be sent to the discharge opening 32d. That is, rotation of the shaft 41 causes the pump rotor 35 to rotate. In other words, the motor part 20 and the pump part 30 have the same rotation axis.

<Housing>

The housing 12 has a multi-layered cylindrical shape having both open ends on the central axis J. A material of the housing 12 is, for example, a metal. The housing 12 holds the motor part 20 and the pump part 30. The housing 12 includes a barrel part 14 and a flange part 15. The barrel part 14 has a cylindrical shape centered on the central axis J. The barrel part 14 includes a busbar assembly insertion part 21a, a stator holding part 21b, and a pump body holding part 21c in this order in the axial direction (the Z-axis direction) from the rear side (−Z side) to the front side (+Z side). The flange part 15 extends outward in the radial direction from the end of the barrel part 14 on the rear side.

The end of the busbar assembly insertion part 21a on the rear side is linked to the tubular part 22a of the cover 13 via the flange part 24 of the cover 13 and the flange part 15 of the housing 12. The busbar assembly insertion part 21a surrounds the end of the busbar assembly 60 on the front side (+Z side) from the side outward from the central axis J in the radial direction. The busbar assembly insertion part 21a, the stator holding part 21b, and the pump body holding part 21c each have a concentric cylindrical shape, and diameters thereof decrease in that order.

The end of the busbar assembly 60 on the front side is positioned inside the housing 12. The inner side surface of the stator holding part 21b comes in contact with the outer side surface of the stator 50, that is, the outer side surface of the core back part 51. Accordingly, the stator 50 is held in the housing 12. The outer circumferential surface of the pump body 31 is fixed to the inner circumferential surface of the pump body holding part 21c.

<Drive Device>

The drive device 100 is disposed between the bearing 42 and the cover 13 and drives the motor part 20.

Figure 2:
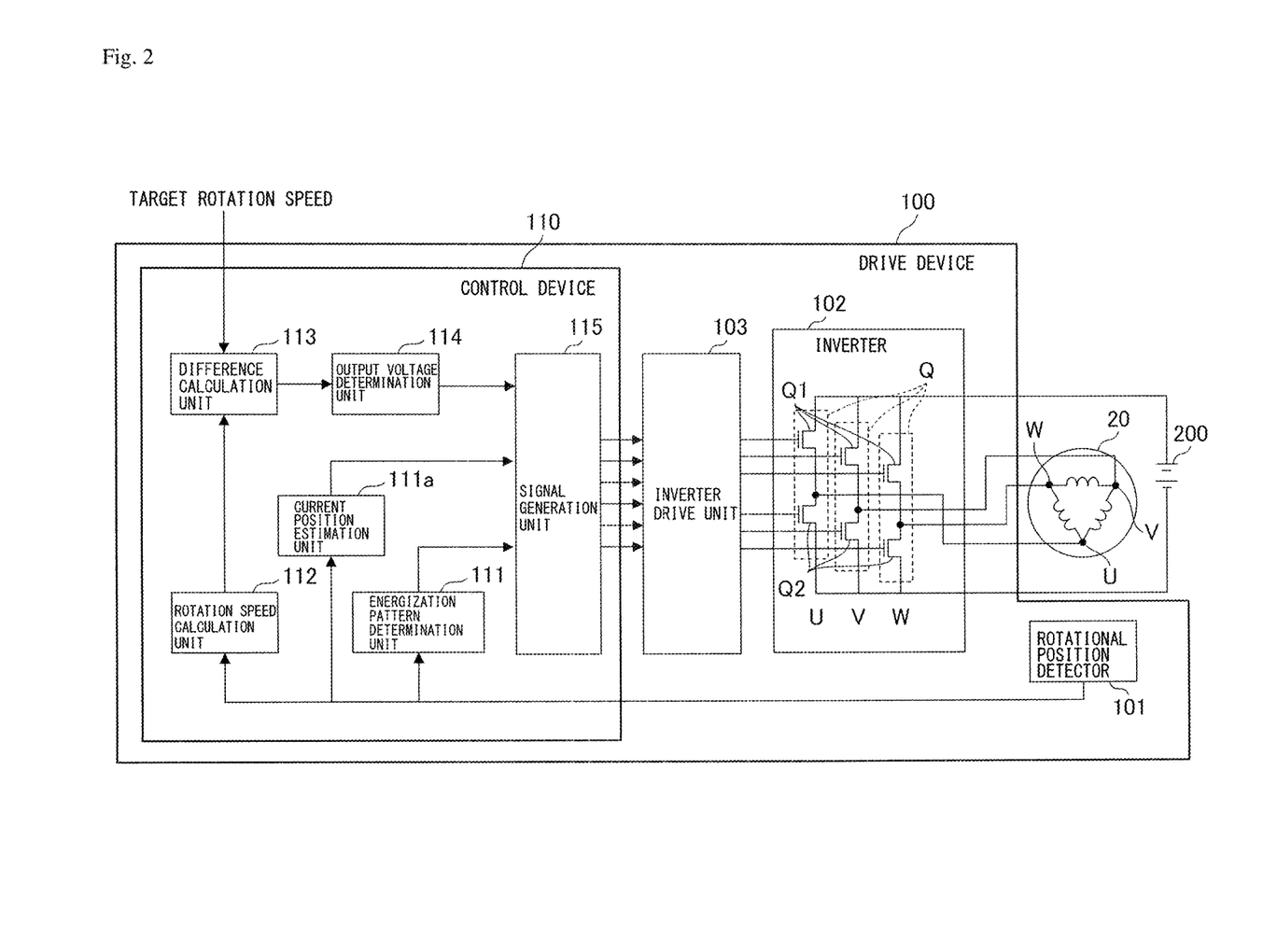
FIG. 2 is a block diagram illustrating a configuration of a drive device illustrated in FIG. 1.

FIG. 2 is a block diagram illustrating a configuration of the drive device 100. In FIG. 2, three phases of the motor part 20 are denoted by a U phase, a V phase, and a W phase respectively.

The drive device 100 includes a rotational position detector 101, an inverter 102, an inverter drive unit 103, and a control device 110 as illustrated in FIG. 2.

The rotational position detector 101 detects a rotational position of the motor part 20, specifically, a rotational position of the rotor 40. As the rotational position detector 101, for example, a magnetic sensor such as a Hall element or a magneto-resistance element, an optical encoder, a resolver, or the like can be used. In addition, the rotational position detector 101 includes a sensor magnet 711 and a sensor magnet holding part 712 illustrated in FIG. 1.

The sensor magnet 711 has an annular shape in which an N pole and an S pole are alternately disposed in the circumferential direction. The sensor magnet holding part 712 is positioned such that a hole at the center fits into a small diameter part of the end of the shaft 41 on the rear side (+Z side). The sensor magnet holding part 712 is rotatable along with the shaft 41. The sensor magnet 711 is disposed on an outer circumferential surface of the sensor magnet holding part 712.

In the present example embodiment, three Hall elements disposed between the three coils 53 are used as the rotational position detector 101. The rotational position detector 101 detects a magnetic field of the sensor magnet 711 with each of the Hall elements and outputs one set of three detection signals that are proportional to the magnitude of the detected magnetic field. Using the one set of detection signals, a rotational position can be detected, for example, every 60° electrical angle. Further, although the example in which detection signals of three Hall elements are set as one set has been described, the number of Hall elements set to be one set is not limited thereto and can be a number according to a configuration of the motor part 20.

<Inverter>

The inverter 102 includes three sets of arms Q each corresponding to the U phase, the V phase, and the W phase of the motor part 20 as illustrated in FIG. 2. Each arm Q is in a bridge connection. Each arm Q includes a switching element Q1 on an upper side and a switching element Q2 on a lower side that are connected in series. As the switching elements Q1 and Q2, semiconductor elements such as field effect transistors (FETs) or metal-oxide-semiconductor FETs (MOSFETs) can be used, and MOSFETs are used in the present example embodiment.

The switching element Q1 on the upper side and the switching element Q2 on the lower side of each arm Q are connected to a power supply 200. The power supply 200 is an external power supply connected via the above-described connector part 63. The inverter 102 receives a control signal generated by the control device 110 and output from the inverter drive unit 103. The inverter 102 switches each of the switching elements Q1 and Q2 on the upper and lower sides of the arm Q of each phase to ON and OFF states according to the input control signal and supplies a drive current in an AC voltage waveform to each phase of the motor part 20, for example, according to ON and OFF times such as a duty ratio.

<Inverter Drive Unit>

The inverter drive unit 103 generates and outputs each of control signals for the switching element Q1 on the upper side and the switching element Q2 on the lower side of each arm Q of the inverter 102 from the control signal generated by control device 110.

<Control Device of Motor>

The control device 110 includes an energization pattern determination unit 111, a current position estimation unit 111*a*, a rotation speed calculation unit 112, a difference calculation unit 113, an output voltage determination unit 114, and a signal generation unit 115 as illustrated in FIG. 2. The content to be processed by each constituent unit of the control device 110 can be realized through software processing executed by a computer reading a program in which processing procedures of each unit are written from a storage medium storing the program. As the computer, for example, a processor such as a central processing unit (CPU) or a graphics processing unit (GPU), a micro-calculator, or the like can be used. As the storage medium, a hard disk, a read only memory (ROM), or the like can be used. Further, the content to be processed by each constituent unit may be realized by hardware such as a field-programmable gate array (FPGA) or a large scale integration (LSI).

The energization pattern determination unit 111 determines an energization pattern of each phase of the motor part 20 based on a rotational position indicated by one set of detection signals output from the rotational position detector 101.

The current position estimation unit 111*a* estimates a current rotational position of the motor part 20, specifically the rotor 40, from the one set of detection signals output from the rotational position detector 101 and the input timing of the detection signals.

The rotation speed calculation unit 112 obtains an amount of change in the rotational position per unit time from the one set of detection signals output from the rotational position detector 101 and calculates the current rotation speed of the motor part 20 from the amount of change.

The difference calculation unit 113 calculates the difference between a target rotation speed and the current rotation speed calculated by the rotation speed calculation unit 112. The difference calculation unit 113 can receive an input of the target rotation speed indicated each time of calculation from an external control device of a vehicle in which the electric oil pump 10 is mounted, or the like, or can receive an input of a certain target rotation speed stored in a storage medium by reading it from the storage medium.

The output voltage determination unit 114 determines a control value of an output voltage of a drive current to be supplied from the power supply 200 to the motor part 20 via the inverter 102 using the difference in rotation speed calculated by the difference calculation unit 113. In the present example embodiment, the inverter 102 is controlled using a pulse width modulation (PWM) method, and the output voltage determination unit 114 determines a duty ratio of a pulse signal generated as a control signal by the signal generation unit 115 as a control value of the output voltage.

The control value of the output voltage can be determined using Proportional-Integral-Differential Controller (PID) control. Specifically, the output voltage determination unit 114 calculates at least one term of a proportional term, an integral term, and a differential term from a difference in rotation speed using a proportion (P) coefficient, integration (I) coefficient, and differentiation (D) coefficient. The output voltage determination unit 114 can determine any one term or the sum of two or more terms of a proportional term, an integral term, and a differential term as a duty ratio of a PWM pulse signal generated by the signal generation unit 115. For example, the output voltage determination unit 114 can determine, as a duty ratio, the sum of three terms of a proportional term, an integral term, and a differential term in a case where PID control is performed, and the sum of a proportional term and an integral term in a case where PI control is performed.

The signal generation unit 115 generates a control signal for causing the inverter 102 to supply a drive current from the power supply 200 to each phase of the motor part 20. As described above, the signal generation unit 115 generates a PWM pulse signal as a control signal in the present example embodiment.

The signal generation unit 115 determines a phase of an AC voltage waveform of the drive current to be supplied to each of the U phase, the V phase, and the W phase of the motor part 20 on the basis of an energization pattern determined by the energization pattern determination unit 111 and a current rotational position estimated by the current position estimation unit 111*a*. In addition, the signal generation unit 115 determines a duty ratio of the pulse signal on the basis of the control value of the output voltage determined by the output voltage determination unit 114. The signal generation unit 115 generates and outputs the pulse signal of the duty ratio determined for the determined phase.

<Procedure for Generating Control Signal>

A specific procedure of the signal generation unit 115 for generating a control signal will be described below.

The signal generation unit 115 generates a pulse signal for causing the inverter 102 to supply a drive current in an AC voltage waveform in which a first energization cycle and a second energization cycle are alternately repeated having a third energization cycle between the first energization cycle and the second energization cycle. The first energization cycle is an energization cycle in which only the switching element Q1 on the upper side of each arm Q is set to be in an ON state. The second energization cycle is an energization cycle in which only the switching element Q1 on the lower side of each arm Q is set to be in an ON state.

In addition, the signal generation unit 115 switches each of the switching elements Q1 and Q2 on the upper side and the lower side of each arm Q to the ON state and the OFF state in order in the third energization cycle, continuously changes an output voltage of the switching element Q1 or Q2 that has been further switched to the ON state, and generates a pulse signal for causing waveforms of the preceding and succeeding first energization cycle and second energization cycle to be continuous by varying a phase of the first to the third energization cycles in each phase of the motor part 20.

Figure 3:
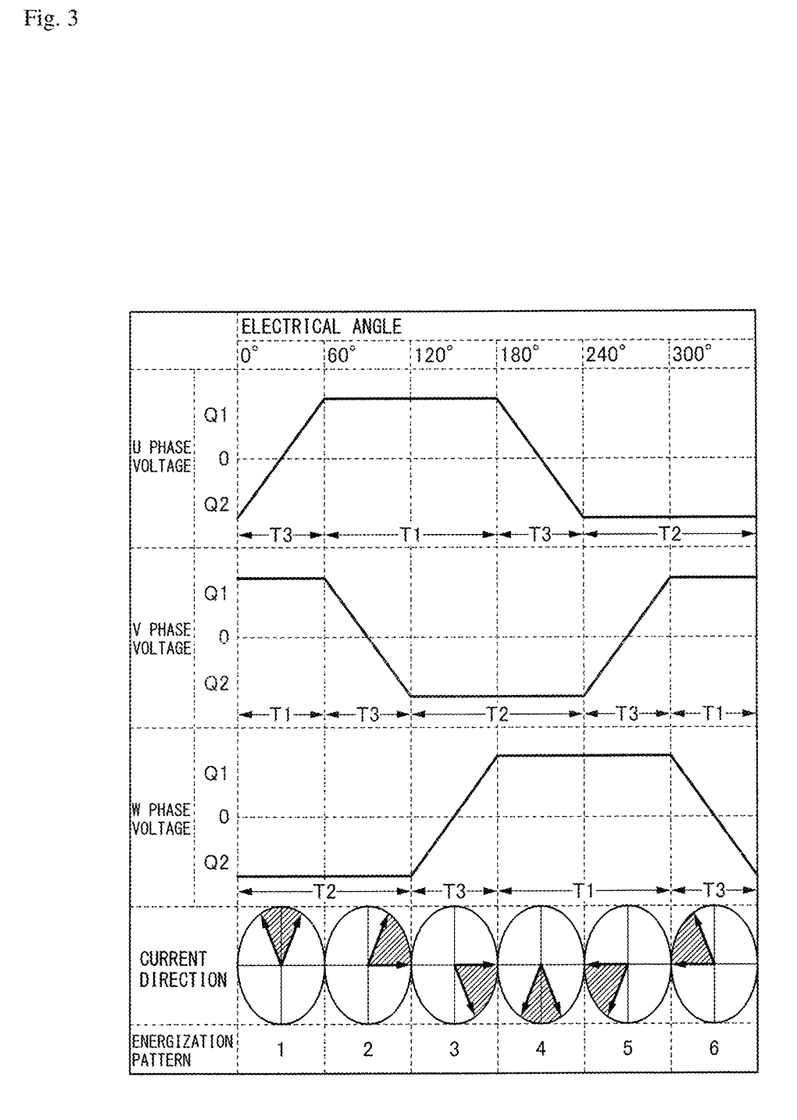
FIG. 3 is a diagram showing AC voltage waveforms of a drive current supplied from an inverter according to a control signal generated by a control device illustrated in FIG. 2.

FIG. 3 illustrates examples of an AC voltage waveform of a drive current supplied from the inverter 102 according to a pulse signal generated by the signal generation unit 115.

As illustrated in FIG. 3, the AC voltage waveform in the U phase repeats each of the energization cycles in order of the third energization cycle T3, the first energization cycle T1, the third energization cycle T3, and the second energization cycle T2 in the phase in which the electrical angle is 0 to 360°. The first energization cycle T1 and the second energization cycle T2 are each a cycle with an electrical angle of 120°, and the third energization cycle T3 is a cycle with an electrical angle of 60°.

In the first energization cycle T1, only the switching element Q1 on the upper side the arm Q is in the ON state, and the output voltage of the switching element Q1, that is, an output voltage of the drive current output from the switching element Q1 is constant. In the second energization cycle T2, only the switching element Q2 on the lower side of the arm Q is in the ON state, and the output voltage of the switching element Q2 is constant. In the third energization cycle T3, each of the switching elements Q1 and Q2 is switched to the ON and OFF states, the output voltage of the switching element switched to the ON state continuously changes and thus the waveforms of the preceding and succeeding first energization cycle T1 and second energization cycle T2 become continuous.

Although the AC voltage waveforms of the V phase and the W phase are the same as the AC voltage waveform of the U phase, the AC voltage waveforms of the phases each deviate by an electrical angle of 120° as shown in FIG. 3. Accordingly, the phases of the first to the third energization cycles differ in each phase.

The AC voltage waveform of each phase has six energization patterns 1 to 6. Each of the energization patterns 1 to 6 is switched in every phase with an electrical angle of 60°. In each of the energization patterns 1 to 6, the phase in the third energization cycle T3 is any one of the U phase, the V phase, and the W phase.

The signal generation unit 115 generates a pulse signal for switching one of the switching element Q1 on the upper side and the switching element Q2 on the lower side of the arm Q that is in the ON state to the OFF state and the other one that is in the OFF state to the ON state at a reference point at which the output voltage is 0 in the third energization cycle T3. Accordingly, the waveform of the preceding and succeeding first energization cycle T1 and second energization cycle T can be continuous by switching energization of each of the switching elements Q1 and Q2 in the third energization cycle T3.

For example, when an energization pattern of the U phase is switched in the order of the energization patterns 6, 1, and 2, the AC voltage waveform is switched in order of the second energization cycle T2, the third energization cycle T3, and the first energization cycle T1 as illustrated in FIG. 3. The signal generation unit 115 generates a pulse signal for switching the switching element Q2 on the lower side that has been in the ON state in the second energization cycle T2 to the OFF state at the reference point by continuously lowering the output voltage of the switching element Q2 in the next third energization cycle T3. Furthermore, the signal generation unit 115 generates a pulse signal for continuously raising the output voltage of the switching element Q1 on the upper side of the arm Q in the U phase that has been in the OFF state in the second energization cycle T2 from the reference point by switching the switching element Q1 to the ON state. Accordingly, in a case where energization is switched from the switching element Q2 on the lower side to the switching element Q1 on the upper side, it is possible to control the waveform to a right-upward waveform.

In addition, when the energization pattern of the U phase is switched in order of the energization patterns 3, 4, and 5, the AC voltage waveform is switched in order of the first energization cycle T1, the third energization cycle T3, and the second energization cycle T2 as illustrated in FIG. 3. The signal generation unit 115 generates a pulse signal for switching the switching element Q1 of the upper side of the arm Q in the U phase that has been in the ON state in the first energization cycle T1 to the OFF state at the reference point by continuously lowering the output voltage of the switching element Q1 in the next third energization cycle T3. Furthermore, the signal generation unit 115 generates a pulse signal for continuously raising the output voltage of the switching element Q2 on the lower side of the arm Q in the U phase that has been in the OFF state in the first energization cycle T1 from the reference point by switching the switching element Q2 to the ON state. Accordingly, in a case where energization is switched from the switching element Q1 on the upper side to the switching element Q2 on the lower side, it is possible to control the waveform to a right-downward waveform.

The signal generation unit 115 continuously changes the output voltage of each of the switching elements Q1 and Q2 by controlling the duty ratio of the pulse signal in the third energization cycle T3. Accordingly, it is possible to gradually change the output voltage.

Figure 4:
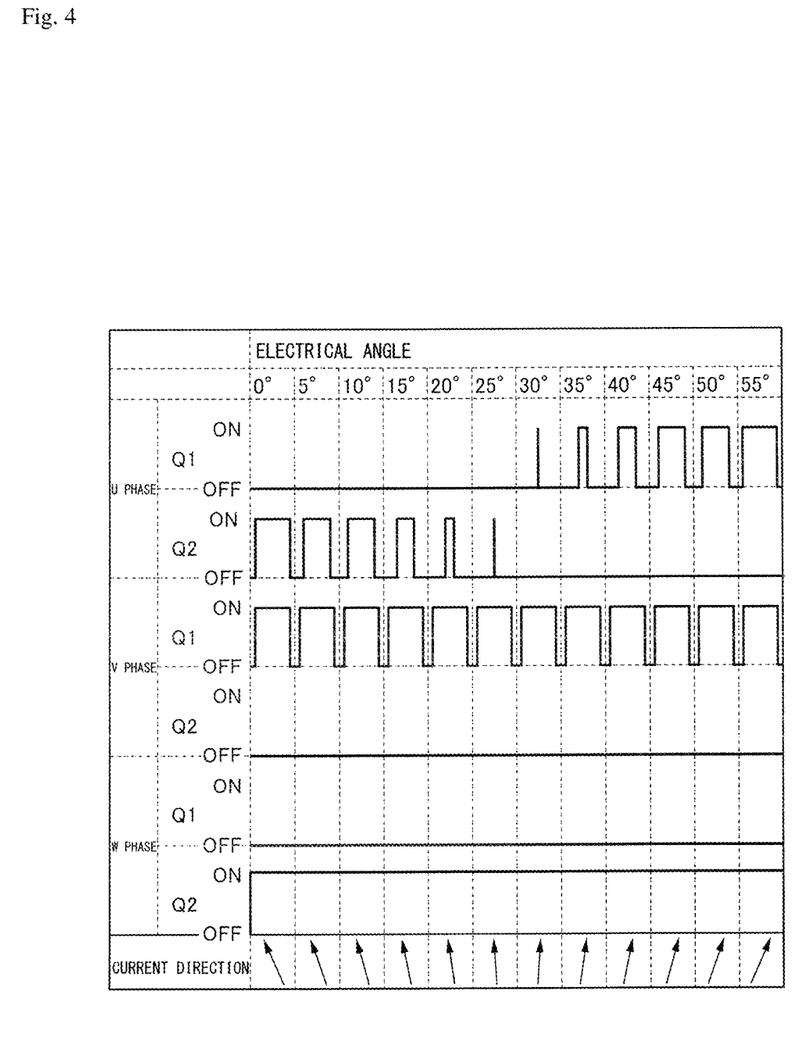
FIG. 4 is a diagram showing pulse signals in phases at electrical angles of 0° to 60°.

FIG. 4 shows pulse signals in the energization pattern 1 of the AC voltage waveform shown in FIG. 3.

In the energization pattern 1 in the cycle with the electrical angles of 0 to 60°, the U phase among the three phases is in the third energization cycle T3 as shown in FIG. 4. The signal generation unit 115 continuously lowers, in the third energization cycle T3, the duty ratio of the pulse signal to be output to the switching element Q2 on the lower side of the arm Q of the U phase that has been in the ON state in the preceding second energization cycle T2. When the duty ratio of the switching element Q2 reaches 0, that is, the reference point at which the output voltage is 0, the signal generation unit 115 switches the switching element Q2 on the lower side of the arm Q of the U phase to the OFF state and the switching element Q1 on the upper side to the ON state. Then, the signal generation unit 115 continuously raises the duty ratio of the pulse signal to be output to the switching element Q1 on the upper side to the duty ratio of the succeeding first energization cycle T1. Accordingly, the current direction in the third energization cycle T3 can be gradually changed.

In the energization pattern 1, the V phase is in the first energization cycle T1 in which only the switching element Q1 on the upper side is in the ON state. The W phase is in the second energization cycle T2 in which only the switching element Q2 on the lower side is in the ON state. In the example shown in FIG. 4, the signal generation unit 115 sets the duty ratio in the ON state to a duty ratio of a constant output voltage determined by the output voltage determination unit 114 in the first energization cycle T1, that is, the energization cycle of the switching element Q1 on the upper side. In addition, the signal generation unit 115 fixes the state to the ON state and operates at the duty ratio of 100% in the second energization cycle T2, that is, the energization cycle of the switching element Q2 on the lower side.

In a case where the first energization cycle is prior to the third energization cycle T3, the signal generation unit 115 continuously lowers the duty ratio of the pulse signal to be output to the switching element Q1 on the upper side of the arm Q in the third energization cycle T3. In addition, the signal generation unit 115 continuously raises the duty ratio of the pulse signal to be output to the switching element Q2 on the lower side of the arm Q to the duty ratio of the succeeding second energization cycle T2. The current direction in the third energization cycle T3 can be gradually changed.

The signal generation unit 115 can determine the duty ratio to be raised or lowered according to a rotational position of the motor part 20. Accordingly, it is possible to set the waveform in the third energization cycle T3 to an arbitrary waveform. For example, in a case where the duty ratio is lowered from 90% to 0% in the rotational position with electrical angles of 0 to 30°, the duty ratio can be lowered by a constant value of 15% each time the rotational position shifts by 5°, and thereby the waveform of the third energization cycle T3 can be set to a linear waveform as shown in FIG. 3. In addition, if a current rotational position is indicated by an electrical angle θ, the duty ratio at each rotational position is determined to sin θ×90%, and thereby the waveform in the third energization cycle T3 can be set to a curved waveform like a sine wave.

Although examples of a general AC voltage waveform for driving the motor include a square wave and a sine wave, the AC voltage waveforms of the present example embodiment shown in FIG. 3 enable rotation to be smoothly controlled with a less amount of calculation than that of a square wave and a sine wave.

Figure 5:
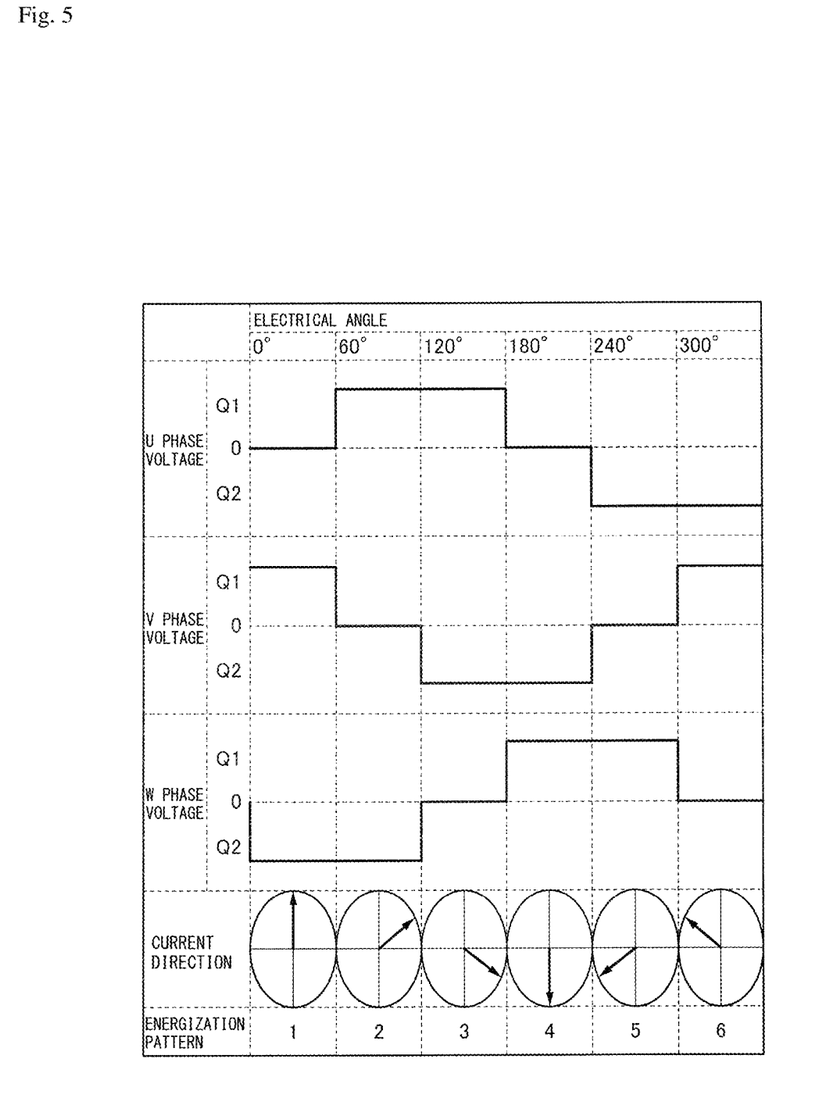
FIG. 5 is a diagram showing an example of square wave AC voltage waveforms.

FIG. 5 shows examples of square wave AC voltage waveforms.

In the square wave AC voltage waveform of each phase of the U phase, the V phase and the W phase, an energization cycle in which only the switching element Q1 on the upper side of the arm Q of each phase is in the ON state and an energization cycle in which only the switching element Q2 on the lower side is in the ON state are repeated having a non-energization cycle in which both the switching elements Q1 and Q2 are in the OFF state therebetween as shown in FIG. 5. The AC voltage waveform of each phase are phases deviated by 120° and has energization patterns 1 to 6 at every 60°. Each energization cycle is a cycle with an electrical angle of 120° and each non-energization cycle is a cycle with an electrical angle of 60°.

In the case of the square wave described above, the current direction at the switching time of each of the energization patterns 1 to 6 significantly changes, and thus torque pulsation easily occurs. On the other hand, in the AC voltage waveforms of the present example embodiment shown in FIG. 3, since a change in the current direction at the switching time of each of the energization patterns 1 to 6 is gradual, rotation of the motor part 20 can be smoothly controlled.

Figure 6A:
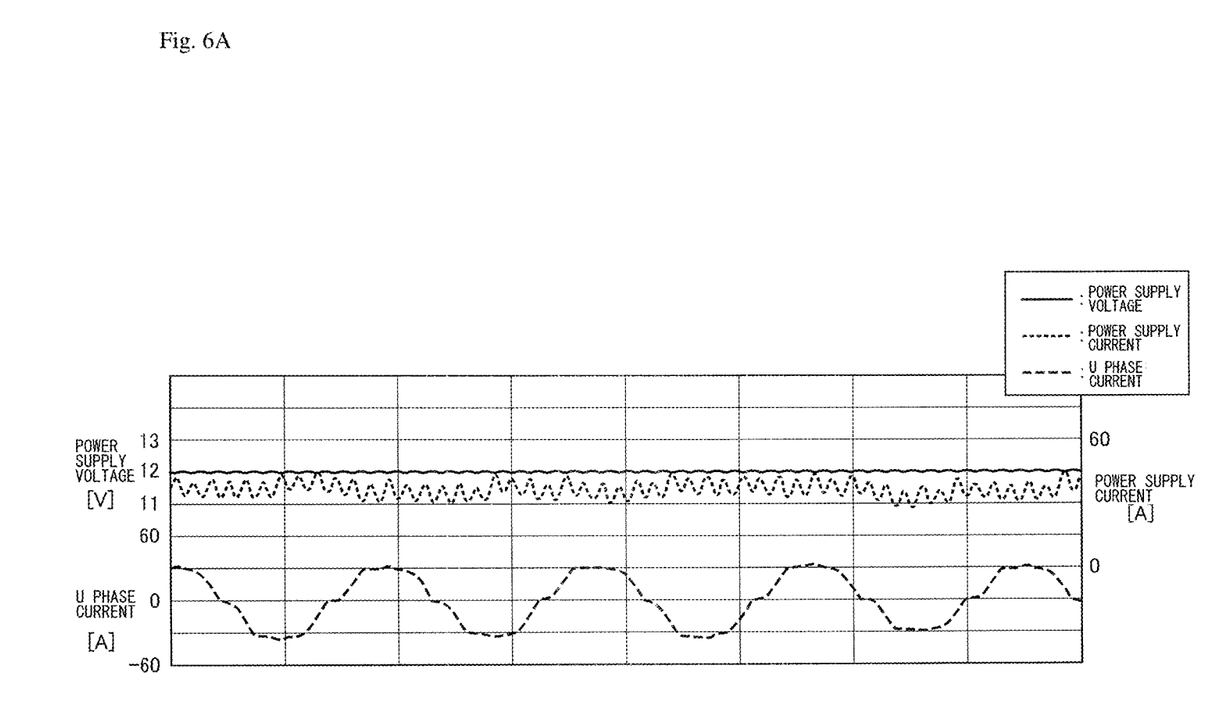
FIG. 6A is a graph showing measurement values of a power supply voltage, a power supply current, and a current of a U phase when a drive current in the AC voltage waveform illustrated in FIG. 3 is supplied.

FIG. 6A shows measurement values of the power supply voltage, the power supply current, and the current of the U phase when a drive current of the AC voltage waveform of the present example embodiment shown in FIG. 3 is supplied. In addition, FIG. 6B shows measurement values of the power supply voltage, the power supply current, and the current of the U phase when a drive current of the square wave AC voltage waveform shown in FIG. 5 is supplied.

Figure 6B:
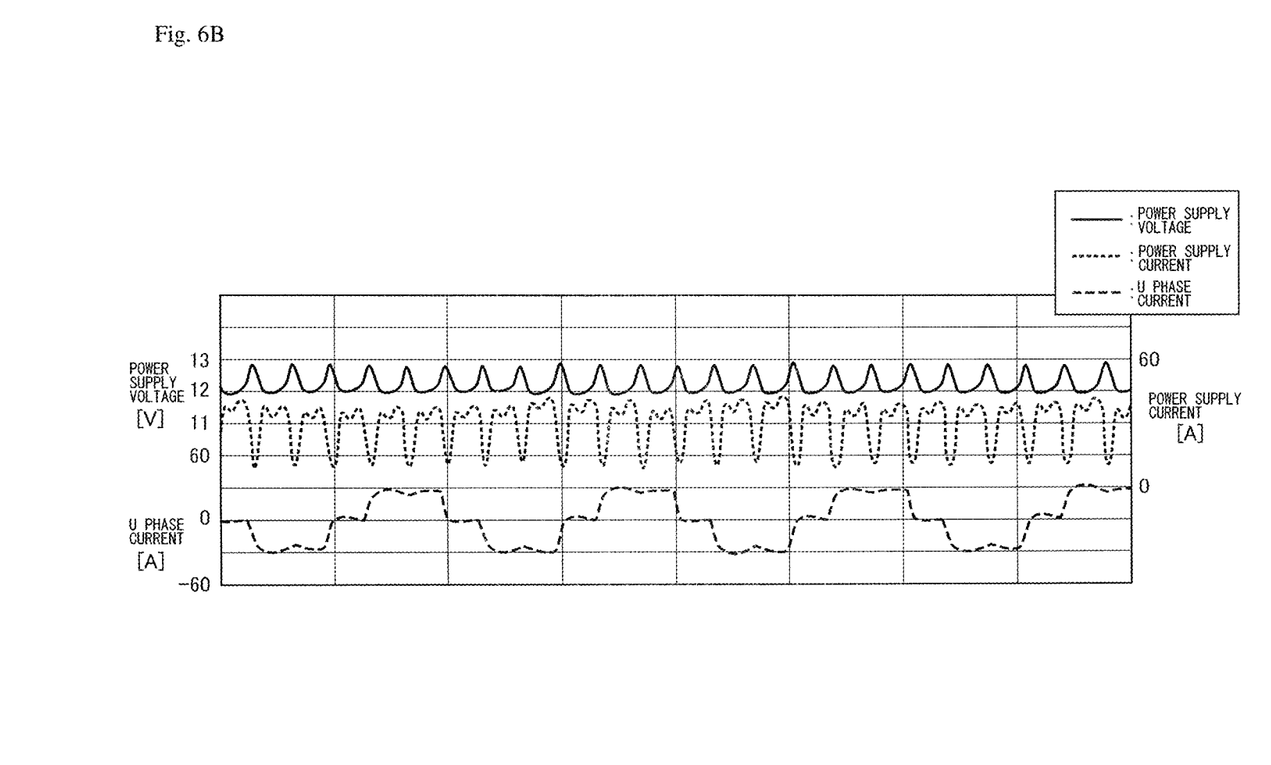
FIG. 6B is a graph showing measurement values of a power supply voltage, a power supply current, and a current in the U phase when a drive current of the square wave shown in FIG. 5 is supplied.

When FIG. 6A and FIG. 6B are compared, although the power supply voltage and the power supply current significantly fluctuate each time the current direction changes in the square wave AC voltage waveform shown in FIG. 5, less fluctuation is shown in the case of the AC voltage waveform of the present example embodiment shown in FIG. 3. In addition, a change in the current waveform of the U phase of the AC voltage waveform shown in FIG. 3 also is more gradual than that of the square wave shown in FIG. 5.

Figure 7:
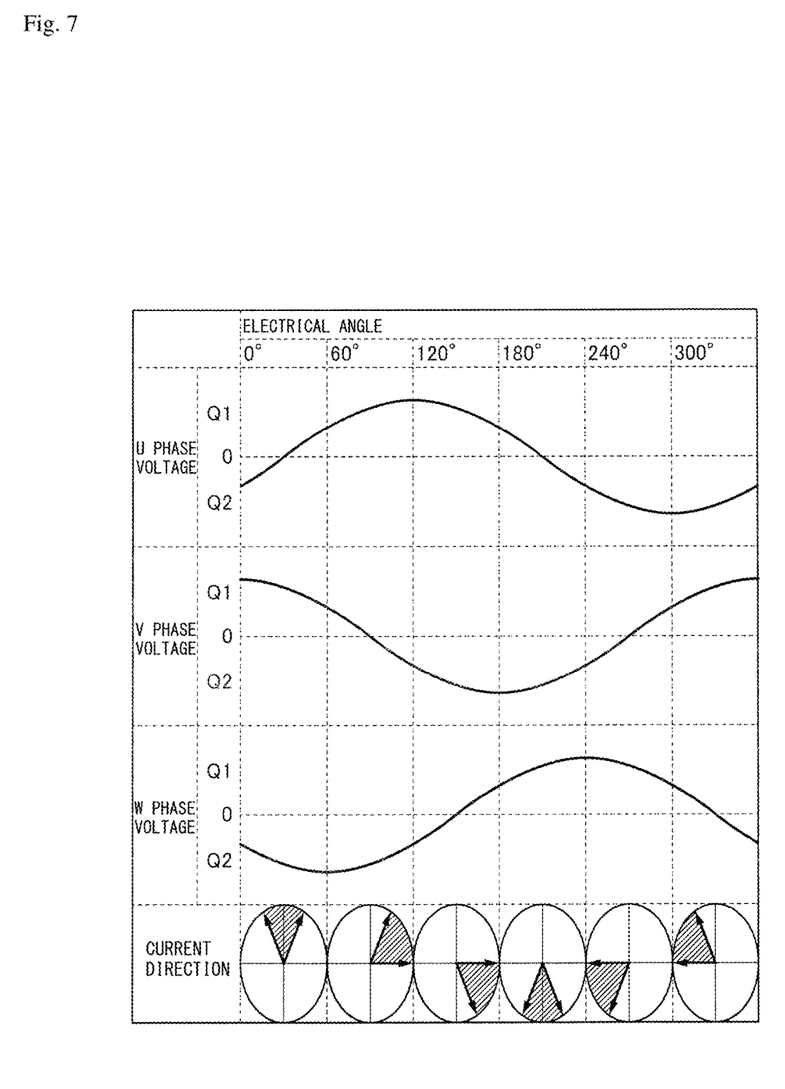
FIG. 7 is a diagram illustrating an example of sine wave AC voltage waveforms.

FIG. 7 illustrates an example of sine wave AC voltage waveforms.

As illustrated in FIG. 7, there is no non-energization cycle in the sine wave AC voltage waveforms. Since the switching element Q1 on the upper side and the switching element Q2 on the lower side of the arm Q of each phase are switched between the ON state and the OFF state and the output voltage of the ON state continuously changes, smooth rotation control is possible. According to the AC voltage waveform of the present example embodiment shown in FIG. 3, rotation control that is close to that for the sine wave is possible, and pulsation caused by the change in the current direction can be reduced.

On the other hand, in the case of the sine wave AC voltage waveform, it needs to calculate a duty ratio of the pulse signal at all times. In addition, duty ratios of all three phases must be calculated at the same time in all phases, and thus a high-performance computer is needed. On the other hand, according to the AC voltage waveform of the present example embodiment shown in FIG. 3, the third energization cycle T3 is the only cycle in which the output voltage needs to be calculated. Only one phase among the three phases is in the third energization cycle T3 in each of the energization patterns 1 to 6, and the amount of calculation is small. Since even a computer, which is not a high-performance computer, can sufficiently execute the calculation, computation resources necessary for the calculation can be configured to be simple.

As described above, according to the control device 110 of the motor part 20 of the present example embodiment, the waveforms of the preceding and succeeding first energization cycle T1 and second energization cycle T2 can be caused to be continuous with the third energization cycle T3. Therefore, a change in the direction of the current in the third energization cycle T3 is gradual, and thus rotation of the motor part 20 can be more smoothly controlled than in the case of the square wave AC voltage waveform. In addition, since only one phase in the energization patterns 1 to 6 is necessary for calculating an output voltage to continuously change, the amount of calculation can be dramatically reduced in comparison to the case of the sine wave AC voltage waveform in which calculation is needed for all three phases in all phases. Therefore, smooth rotation control can be realized with a simple configuration.

In the electric oil pump 10, pulsation of oil to be transported can be suppressed particularly effectively by reducing pulsation of the motor part 20 with the control device 110 of the motor part 20. In addition, since the control device 110 may have a simple configuration, costs for the electric oil pump 10 can be reduced accordingly.

Although example embodiments of the present disclosure have been described above, the present disclosure is not limited thereto.

For example, although an example of a three-phase motor has been described as the motor part 20, the present disclosure can also be applied to a multi-phase motor other than a three-phase motor.

In addition, although an example of the motor part 20 in which the coils 53 of the phases are in a delta connection has been described, the present disclosure can also be applied to a motor in which coils 53 of phases are in a star connection.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device of a motor that controls driving of a motor including a plurality of phases, the control device comprising:
a signal generator to generate a control signal that causes an inverter to supply a drive current from a power supply to each phase of the motor; wherein
the inverter includes a plurality of arms corresponding to each of the phases of the motor, the arms being in a bridge connection, each of the arms includes a switch on an upper side and a switch on a lower side that are connected in series, the switch on the upper side and the switch on the lower side of each of the arms are switched to an ON state and an OFF state according to the control signal to supply a drive current in an AC voltage waveform to each phase of the motor; and
the signal generator alternately repeats a first energization cycle in which only the switch on the upper side of the arm is set to the ON state and a second energization cycle in which only the switch on the lower side of the arm is set to the ON state in an AC voltage waveform including a third energization cycle between the first energization cycle and the second energization cycle, switches the switch on the upper side and the switch on the lower side of the arm to the ON state and the OFF state in order in the third energization cycle, further continuously changes an output voltage of the switch that has been switched to the ON state, and generates a control signal to cause waveforms of the preceding and succeeding first energization cycle and second energization cycle to be continuous with the third energization cycle by varying a phase of the first to the third energization cycles in each phase of the motor.

2. The control device of a motor according to claim 1, wherein the signal generator switches, among the switch on the upper side and the switch on the lower side of the arm, a switch in the ON state to the OFF state and a switch in the OFF state to the ON state at a reference point at which the output voltage is zero.

3. The control device of a motor according to claim 2, wherein, in a case where the second energization cycle is prior to the third energization cycle, the signal generator continuously lowers, in the third energization cycle, an output voltage of the switch on the lower side of the arm that has been in the ON state in the second energization cycle to switch the state to the OFF state when the output voltage reaches the reference point, and further switches the switch on the upper side of the arm that has been in the OFF state in the second energization cycle to the ON state to continuously increase the output voltage of the switch from the reference point.

4. The control device of a motor according to claim 3, wherein
the control signal is a pulse width-modulated pulse signal; and
the signal generator continuously lowers a duty ratio of a pulse signal to be output to the switch on the lower side of the arm in the third energization cycle to continuously increase a duty ratio of a pulse signal to be output to the switch on the upper side of the arm.

5. The control device of a motor according to claim 4, wherein the signal generator determines the duty ratio according to a rotational position of the motor.

6. The control device of a motor according to claim 4, wherein, in a case where the first energization cycle is prior to the third energization cycle, the signal generator continuously lowers, in the third energization cycle, an output voltage of the switch on the upper side of the arm that has been in the ON state in the first energization cycle to switch the ON state to the OFF state when the output voltage reaches the reference point and further switches the switch on the lower side of the arm that has been in the OFF state in the first energization cycle to the ON state to continuously increase the output voltage of the switch from the reference point.

7. The control device of a motor according to claim 4, wherein
each of the first energization cycle and the second energization cycle is a cycle with an electrical angle of 120°; and
the third energization cycle is a cycle with an electrical angle of 60°.

8. The control device of a motor according to claim 3, wherein, in a case where the first energization cycle is prior to the third energization cycle, the signal generator continuously lowers, in the third energization cycle, an output voltage of the switch on the upper side of the arm that has been in the ON state in the first energization cycle to switch the ON state to the OFF state when the output voltage reaches the reference point and further switches the switch on the lower side of the arm that has been in the OFF state in the first energization cycle to the ON state to continuously increase the output voltage of the switch from the reference point.

9. The control device of a motor according to claim 3, wherein
each of the first energization cycle and the second energization cycle is a cycle with an electrical angle of 120°; and
the third energization cycle is a cycle with an electrical angle of 60°.

10. The control device of a motor according to claim 2, wherein, in a case where the first energization cycle is prior to the third energization cycle, the signal generator continuously lowers, in the third energization cycle, an output voltage of the switch on the upper side of the arm that has been in the ON state in the first energization cycle to switch the ON state to the OFF state when the output voltage reaches the reference point and further switches the switch on the lower side of the arm that has been in the OFF state in the first energization cycle to the ON state to continuously increase the output voltage of the switch from the reference point.

11. The control device of a motor according to claim 10, wherein the control signal is a pulse width modulated pulse signal; and the signal generator continuously lowers a duty ratio of a pulse signal to be output to the switch on the upper side of the arm in the third energization cycle and continuously increases a duty ratio of a pulse signal to be output to the switch on the lower side of the arm.

12. The control device of a motor according to claim 11, wherein the signal generator determines the duty ratio according to a rotational position of the motor.

13. The control device of a motor according to claim 11, wherein each of the first energization cycle and the second energization cycle is a cycle with an electrical angle of 120°; and the third energization cycle is a cycle with an electrical angle of 60°.

14. The control device of a motor according to claim 10, wherein each of the first energization cycle and the second energization cycle is a cycle with an electrical angle of 120°, and the third energization cycle is a cycle with an electrical angle of 60°.

15. The control device of a motor according to claim 2, wherein each of the first energization cycle and the second energization cycle is a cycle with an electrical angle of 120°; and the third energization cycle is a cycle with an electrical angle of 60°.

16. The control device of a motor according to claim 1, wherein each of the first energization cycle and the second energization cycle is a cycle with an electrical angle of 120°; and the third energization cycle is a cycle with an electrical angle of 60°.

17. The control device of a motor according to claim 1, wherein the plurality of phases includes three phases.

18. The control device of a motor according to claim 1, wherein the motor is a motor in which coils of the phases are in a delta connection.

19. The control device of a motor according to claim 1, wherein the motor is included in an electric oil pump.

20. A non-transitory computer-readable storage medium storing a program to cause a computer that controls driving of a motor including a plurality of phases to perform a method comprising:

generating a control signal that causes an inverter to supply a drive current from a power supply to each phase of the motor; wherein the inverter includes a plurality of arms corresponding to each of the phases of the motor, the arms being in a bridge connection, each of the arms includes a switch on an upper side and a switch on a lower side that are connected in series, the switch on the upper side and the switch on the lower side of each of the arms corresponding to each phase of the motor are switched to an ON state and an OFF state according to the control signal to supply a drive current in an AC voltage waveform to each phase of the motor; and in the generating the control signal, a first energization cycle in which only the switch on the upper side of the arm is set to the ON state and a second energization cycle in which only the switch on the lower side of the arm is set to the ON state are alternately repeated in an AC voltage waveform, a third energization cycle is provided between the first energization cycle and the second energization cycle, the switch on the upper side and the switch on the lower side of the arm are switched to the ON state and the OFF state in order in the third energization cycle, an output voltage of the switch that has been switched to the ON state is further continuously changed, and a control signal to cause waveforms of the preceding and succeeding first energization cycle and second energization cycle to be continuous with the third energization cycle is generated by varying a phase of the first to the third energization cycles in each phase of the motor.

\* \* \* \* \*